Feb. 18, 1941.  W. BAECKLER  2,231,870
IRRADIATING PROCESS AND APPARATUS
Original Filed March 31, 1934
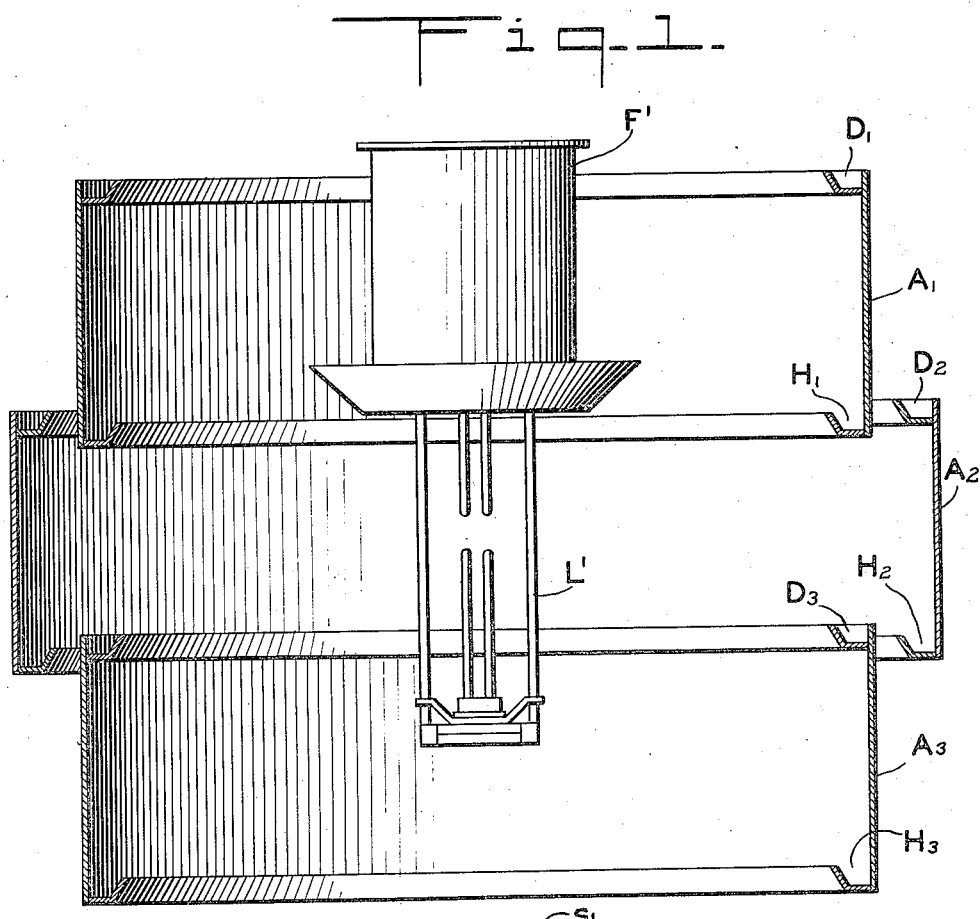
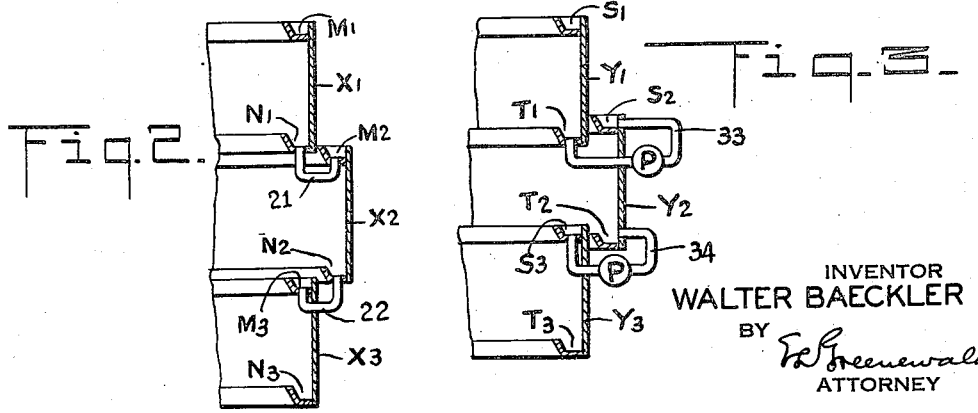
INVENTOR
WALTER BAECKLER
BY F. Greenewald
ATTORNEY Patented Feb. 18, 1941

2,231,870

UNITED STATES PATENT OFFICE 2,231,870

IRRADIATING PROCESS AND APPARATUS

Walter Baeckler, Lakewood, Ohio, assignor, by mesne assignments, to Union Carbide and Carbon Corporation, a corporation of New York Original application March 31, 1934, Serial No. 718,403. Divided and this application September 21, 1938, Serial No. 230,949

7 Claims. (Cl. 250—49)

This invention relates to means and process for irradiating substances with radiant energy in order to modify the properties thereof or to produce new properties therein. Although it is especially adapted for use in the irradiation of liquids, it may also be used for the irradiation of solids in finely divided form. Various types of radiant energy may be used, but the invention will be particularly described in connection with the irradiation of liquids with ultraviolet energy. The use of ultraviolet energy for the irradiation of food and other products is of constantly increasing commercial importance, and I have devised a novel form of irradiating apparatus in which means are provided for the retardation and regulation of the speed of travel and length of exposure of the material passing through the irradiating apparatus.

An object of the invention is to devise an apparatus so arranged as to give the material, whether in liquid or granular form, as nearly as possible a constant speed or progress during irradiation, and at the same time to provide for adequate mixing to the end that all portions and particles of the material being irradiated will be equally exposed to the source of radiant energy.

Another object of my invention is to produce a type of apparatus for use in the irradiation of liquids which will permit the irradiation of a maximum amount of liquids in a given time without causing the liquid to splash.

Another object of my invention is to devise a new process for irradiating liquid or granular material in which different portions of the material being irradiated are simultaneously exposed to irradiation from a common source and in which provision is made for correcting different tendencies from said source.

A further object of my invention is to produce a simple and inexpensive type of apparatus which will be rugged, durable, and easy of operation and maintenance.

Other objects of the invention will be in part obvious and will in part appear hereinafter.

In irradiating fluids such as milk, it is customary to pass the milk in a thin film over a surface, and to expose the liquid to ultraviolet energy while in such form. By this irradiation certain well-known beneficial effects are produced, and the securing of different effects may require modifications in the arrangement of the surface over which the liquid flows and its position with respect to the source of radiation. Accordingly, various types of irradiating apparatus are required to give the irradiation which is considered most efficient under various circumstances. The form of apparatus disclosed herein is especially designed to give an approximately uniform rate of flow over the surface upon which the liquid being irradiated flows.

The invention accordingly comprises apparatus embodying features of construction, combinations of elements, and arrangement of parts which are adapted to effect such steps all as exemplified in the following detailed disclosure, the scope of the application of which will be indicated in the claims.

For a fuller understanding of the nature and objects of the invention, reference should be had to the following detailed description taken in connection with the accompanying drawing, in which:

Figure 1 is a central vertical section showing the construction of apparatus illustrating one embodiment of my invention;

Figure 2 is a portion of a similar view showing a modified form of apparatus;

Figure 3 is a portion of a similar view illustrating another embodiment of my invention.

In Fig. 1 are shown a source of energy L', supported in any suitable manner as by a support F', and a plurality of casing sections $A_1$, $A_2$, and $A_3$, surrounding the source of energy L'. The source of energy L' is represented as a carbon arc lamp, which has been found to be a very efficient source of ultraviolet energy. However, other sources of ultraviolet energy, or sources of other types of radiant energy, may be employed. A duct, or other means, may be provided for removing fumes or gaseous products during the production of radiant energy. The casings, which may be supported in any suitable manner, are preferably cylindrical, and may be divided the more conveniently to permit of cleaning and of access to the source of radiant energy. The interior of the casings forms a smooth surface over which the liquid being irradiated flows in a substantially rectilinear direction which is substantially parallel to a straight line passing through the source while the material is being exposed to radiation from the source of ultraviolet energy. The liquid is supplied to the interior surface of each of the casings by distributing means $D_1$, $D_2$ and $D_3$, and is collected by suitable means $H_1$, $H_2$ and $H_3$, respectively. The distributors should be so arranged as to give a substantially uniform distribution of the liquid at the top of the casings, along the interior circumference of each.

The liquid may be permitted to flow over the surface of each of the casings in turn, in which case suitable means (not shown in Figure 1) may be provided for transferring the liquid from $H_1$ to $D_2$ and from $H_2$ to $D_3$. On the other hand, the liquid may be divided and separate portions supplied to $D_1$, $D_2$ and $D_3$, and these portions after being irradiated are collected at $H_1$, $H_2$ and $H_3$ and may be commingled. This would be done by suitable conduits which are not shown in detail.

The means provided by the present invention for the retardation of the speed of travel and for mixing the material may be used to advantage, in accordance with the objects thereof, for the more precise regulation of the length of exposure of the material, to the end that all particles of the material being irradiated will be exposed equally to the source of radiant energy.

By the diversion of the liquid to three places on the interior of the casing, I am enabled in many cases to attain an increased efficiency over the methods wherein the liquid is passed over the entire surface in a film or layer as much as three times as thick. This is because the surfaces are so spaced and proportioned as to utilize the maximum momentary absorption effect, which seems to be highest during the first stages of an exposure to radiant energy. As will be apparent from the drawing, previously exposed liquid contained in the collecting and distributing means, wherein retardation of flow and mixing take place, will not be exposed to radiant energy from the source $L'$. It is also apparent that additional mixing of previously exposed material will also take place as a result of transfer of such liquid from $H_1$ to $D_2$ and from $H_2$ to $D_3$.

Suitable means for transferring the liquid from $H_1$ to $D_2$ and from $H_2$ to $D_3$, as previously referred to, are illustrated in Figures 2 and 3.

In Figure 2, $X_1$, $X_2$ and $X_3$ are casings, corresponding to $A_1$, $A_2$ and $A_3$ respectively. Similarly, the upper troughs or distributing means $M_1$, $M_2$ and $M_3$ correspond respectively to the upper troughs or distributing means $D_1$, $D_2$ and $D_3$ of Figure 1, while the lower troughs or collecting means $N_1$, $N_2$ and $N_3$ correspond to lower troughs or collecting means $H_1$, $H_2$ and $H_3$. Transferring means 21 is a pipe or conduit for the purpose of transferring the previously irradiated liquid, such as milk for instance, from the lower trough or collecting means $N_1$ to the upper trough or distributing means $M_2$. In similar fashion the transferring means 22, is also a pipe or conduit for the purpose of transferring the liquid irradiated while traversing the surface of casing $X_2$ from the collecting means $N_2$ to the distributing means $M_3$.

In Figure 3, the casings $Y_1$, $Y_2$ and $Y_3$ correspond to casings $A_1$, $A_2$ and $A_3$, respectively, of Figure 1. In similar fashion, the distributing means $S_1$, $S_2$ and $S_3$ of Figure 3 correspond respectively to the distributing means $D_1$, $D_2$ and $D_3$, while the collecting means $T_1$, $T_2$ and $T_3$ correspond to the collecting means $H_1$, $H_2$ and $H_3$ of Figure 1. Transferring means 33 and 34 are pipes or conduits for the purpose of transferring the liquid collected in means $T_1$ and $T_2$ to distributing means $S_2$ and $S_3$ respectively. If it is so desired, a pump or other means P may be interposed in the transferring means 33, 34, or both, as an assistance in making the transfer of liquid. It will be obvious that mixing of previously irradiated liquid will take place in each of the collecting means as well as in each of the transferring means of Figures 2 and 3, as was disclosed with respect to Figure 1 and the transferring of the liquid therein. Additional mixing of previously irradiated liquid will take place also in the pump P and in the distributing means ($D_2$ and $D_3$ of Figure 1; $M_2$ and $M_3$ of Figure 2; and $S_2$ and $S_3$ of Figure 3) to which previously irradiated milk may be delivered. Inasmuch as the liquid in the distributing means, in the collecting means, and in the transferring means is shielded from the source of radiant energy, the mixing of previously irradiated liquid takes place in such means while the liquid is not exposed to radiant energy.

Where the liquid is to flow over the entire surface, it may be advantageous, in order to obtain greater uniformity of irradiation, for the successive exposures of the liqiud to take place at different distances from the source. This may be done by making the casings of different diameters. The arrangement shown in the drawing, where the casing $A_2$ has a diameter greater than that of casings $A_1$ and $A_3$, may be of particular advantage where the radiation is not uniformly distributed in points on a vertical plane passing through the source of energy. Where, for example, the radiation emanating from the source of energy $L'$ falls more directly on the interior surface of the casing $A_2$, and where points on the surface of $A_2$ would be closer to the source of energy than corresponding points on the pair of surfaces of $A_1$ and $A_3$, if all were the same diameter, the effect of the radiant energy on the surface may be equalized by making the diameter of casing $A_2$ greater than that of $A_1$ and $A_3$, or by making the vertical dimension smaller, or by a combination of these two means. Such arrangements for equalizing the effect of the radiant energy on the surface are also advantageous and desirable where it is preferred, in certain cases, to divide the liquid and let separate portions thereof flow along the interior surfaces of the separate casings $A_1$, $A_2$ and $A_3$. In such cases it is also desirable that the separate portions of the liquid be uniformly affected by the radiant energy.

The apparatus and process herein described are particularly well adapted for the irradiation of milk. This statement is not to be understood as a limitation, as I am well aware that the apparatus can be used in connection with a great variety of liquids or of solids in a granular or pulverulent form.

The present application is a division of my copending application filed March 31, 1934, Serial No. 718,403 (Patent No. 2,138,657, dated December 13, 1938).

I claim:

1. Process of irradiating liquid or granular material by energy from a source of ultraviolet energy spaced therefrom which comprises flowing such material in a thin layer or film along a smooth surface and in a substantially rectilinear direction which is substantially parallel to a straight line passing through said source while the material is being exposed to radiation from said source of ultraviolet energy; retarding the flow after a period of such exposure, and mixing the thus irradiated material while such irradiated material is not receiving radiant energy from said source; and at least once thereafter so flowing the thus irradiated and subsequently mixed material along a smooth surface, and in a substantially rectilinear direction which is substantially parallel to said line, that previously exposed material flows at a greater distance from said line than during a previous exposure but at about the same distance from said source; and again exposing said liquid or granular material to ultraviolet energy from the same source during such flow after said mixing; whereby the length of the exposure of the material may be more precisely regulated and irradiated particles of material substantially more equally exposed to radiation from said source.

2. In an irradiating process in which a plurality of thin layers or films of liquid are simultaneously exposed to radiation from a common source of ultraviolet energy only while substantially all of the liquid undergoing such simultaneous exposure is flowing in thin layers or films spaced from said source, the steps which include flowing the liquid along a smooth surface and in a substantially rectilinear direction which is substantially parallel to a straight line passing through said source while the liquid is being exposed to radiant energy from a source of ultraviolet energy; retarding the flow after said period of such exposure and mixing the thus irradiated liquid while such irradiated material is not receiving ultraviolet energy from said source; and at least once thereafter so flowing the thus irradiated and subsequently mixed liquid along a smooth surface, and in a substantially rectilinear direction which is substantially parallel to said line, that previously exposed material flows at a greater distance from said line than during a previous exposure but at about the same distance from said source; and again exposing said liquid to radiant energy from the same source during such flow after said mixing; whereby the length of the exposure of the liquid may be more precisely regulated and irradiated particles of liquid substantially more equally exposed to radiation from said source.

3. In an irradiating process in which a plurality of thin layers or films of milk are simultaneously exposed to radiation from a common source of ultraviolet energy only while substantially all of the milk during such simultaneous exposure is flowing in thin layers or films spaced from said source, the steps which comprise flowing the milk along a smooth surface and in a substantially rectilinear direction which is substantially parallel to a straight line passing through said source while the milk is being exposed to radiation from said source of ultraviolet energy; retarding the flow after a period of such exposure and mixing the thus irradiated milk while such irradiated material is not receiving radiant energy from said source; and at least once so flowing the thus irradiated and subsequently mixed milk along a smooth surface, and in a substantially rectilinear direction which is substantially parallel to said line, that previously exposed material is at a greater distance from said line than was the same material during a previous exposure but at about the same distance from said source; and again exposing said milk to radiant energy from the same source during such flow after said mixing; whereby the length of the exposure of the milk may be more precisely regulated and irradiated particles of milk substantially more equally exposed to radiation from said source.

4. In an irradiating process in which a plurality of thin layers or films of milk are simultaneously exposed to radiation from a common source of ultraviolet energy only while substantially all of the milk during such simultaneous exposure is flowing in such thin layers or films spaced from said source, the steps which comprise flowing the milk downwardly, under the influence of gravity, along a smooth surface in a substantially rectilinear direction and in the form of a thin film or layer which is substantially cylindrically curved about a vertical axis passing through said source while the milk is receiving radiation from said source of ultraviolet energy; retarding the flow after a period of such irradiation, and mixing the thus irradiated milk while such irradiated material is not receiving radiant energy from said source; and so flowing the thus irradiated and subsequently mixed milk, under the influence of gravity, at least once along a smooth surface, in a substantially rectilinear direction and in the form of a thin film or layer which is substantially cylindrically curved about said axis, that previously exposed material is at a greater distance from said line than was the same material during a previous exposure but at about the same distance from said source; and again exposing said milk to radiant energy from the same source during such flow after mixing; whereby the length of the exposure of the milk may be more precisely regulated and irradiated particles of milk substantially more equally exposed to radiation from said source.

5. An irradiating apparatus comprising, in combination, a source of radiant energy and means forming, about said source, a pair of substantially cylindrical surfaces spaced in an axial direction from each other, and another substantially cylindrical surface having a radius greater than either of said surfaces positioned intermediately of said pair of surfaces, all of said surfaces being substantially coaxial and adapted for flow of material thereover in an axial direction; said source being located about on the common axis of said surfaces and opposite such intermediately positioned surface; said means being so constructed and arranged that material flowing over said surfaces may receive radiant energy simultaneously, and the radial distance from said axis to such intermediately positioned surface being greater than the radial distance from said axis to either of the surfaces of said pair of surfaces.

6. An irradiating apparatus comprising, in combination, a source of radiant energy and means forming, about said source, a pair of substantially cylindrical surfaces spaced in an axial direction from each other, and another substantially cylindrical surface having a radius greater than either of said surfaces positioned intermediately of said pair of surfaces, all of said surfaces being substantially coaxial and adapted for flow of material in series thereover in an axial direction; said source being located about on the common axis of said surfaces and opposite such intermediately positioned surface; said means being so constructed and arranged that material flowing over said surfaces may receive radiant energy simultaneously, and the radial distance from said axis to such intermediately positioned surface being greater than the distance from said axis to either of the surfaces of said pair of surfaces.

7. An irradiating apparatus comprising, in combination, a source of radiant energy and means forming, about said source, a pair of substantially cylindrical substantially vertical surfaces spaced in an axial direction from each other, and another substantially vertical substantially cylindrical surface having a radius greater than either of said surfaces positioned intermediately of said pair of surfaces, all of said surfaces being substantially coaxial and adapted for flow of material downwardly thereover in a substantially vertical direction; said source being disposed about on the common axis of said surfaces and opposite such intermediately positioned surface; said means being so constructed and arranged that material flowing over said surfaces may receive radiant energy simultaneously, and the radial distance from said axis to such intermediately positioned surface being greater than the radial distance from the axis to either of the surfaces of said pair of surfaces.

WALTER BAECKLER.

CERTIFICATE OF CORRECTION.

Patent No. 2,231,870.

February 18, 1941.

WALTER BAECKLER.

It is hereby certified that error appears in the printed specification of the above numbered patent requiring correction as follows: Page 2, second column, line 56, for "No. 2,138,657" read --No. 2,139,657--; page 3, first column, line 22, claim 2, for "a source" read --said source--; line 23, for "said period" read --a period--; and that the said Letters Patent should be read with this correction therein that the same may conform to the record of the case in the Patent Office.

Signed and sealed this 8th day of April, A. D. 1941.

(Seal)

Henry Van Arsdale,
Acting Commissioner of Patents.